United States Patent Office 3,484,442
Patented Dec. 16, 1969

3,484,442
RESERPINE 3,5,3'-TRIIODOTHYROACETATE
Roger J. Vendel, Paris, France, assignor to Egema S.A., Paris, France
No Drawing. Filed May 26, 1967, Ser. No. 641,452
Claims priority, application France, May 27, 1966, 63,270; May 11, 1967, 106,044
Int. Cl. C07d 57/10; A61k 27/00
U.S. Cl. 260—286
1 Claim

ABSTRACT OF THE DISCLOSURE

The present invention provides the new and useful compound reserpine 3,5,3'-triiodothyroacetate. The invention also provides the method for producing such compound by reacting reserpine with 3,5,3'-triiodothyroacetic acid in acetic acid medium. Also provided are pharmaceutical compositions containing such compound as the active ingredient, such pharmaceutical compositions being capable of exerting a simultaneous therapeutic action both on the blood hypertension and on the symptoms usually accompanying such diesease.

---

The present invention relates to a novel product suitable for use in therapeutics on account of its hypotensive, antisclerous and antiatheromatous properties; this invention is concerned more particularly with a novel hypotensive, antisclerous and antiatheromatous medicament consisting of, or containing, a reserpine salt, and still more particularly to a novel medicament consisting of, or containing, reserpine 3,5,3'-triiodothyroacetate.

The present invention also relates to a process for preparing the reserpine 3,5,3'-triiodothyroacetate the structural formula of which is as follows:

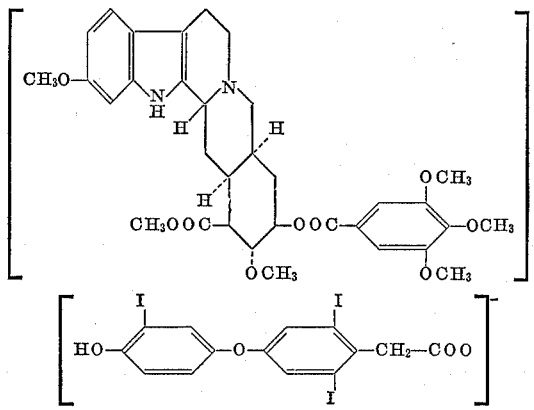

It is known that reserpine and its salts, such as more particularly hydrochloride, sulfate, perchlorate, nitrate, oxalate, methylbromide, maleate and picrate, exert a hypotensive, tranquillizing and sedative therapeutic activity.

It is also known that 3,5,3'-triiodothyronine, and more particularly L-3,5,3'-triiodothyronine, as well as its salts, notably its sodium salt and its hydrochloride, exert a therapeutic action in the case of metabolic insufficiencies and hypothyroidal diseases, and also accessorily in case of amenorrhoea, premenstrual tension, dysmenorrhoea, masculine sterility and locally in cases of dermatites caused by radiation.

It is also known that a medicament known under the trade name of "Triac," which is a derivative of 3,5,3'-triiodothyronine in which the lateral α-aminopropionic acid chain is replaced by glycine, exerts a hypocholesterolemizing action, like the triiodothyropropionic acid, which is a derivative of 3,5,3'-triiodothyronine in which propionic acid is substituted for the lateral alanine chain.

Furthermore, it is known that certain disorders such as hypercholesterolemia and hyperneurotonia constitute symptoms accompanying arterial hypertension.

Therefore, is was particularly desirable to find a medicament capable of exerting a simultaneous therapeutical action on arterial hypertension and its accompanying symptoms.

The applicant has now found such a medicament, which is reserpine 3,5,3'-triiodothyroacetate, a substance capable of exerting a simultaneous therapeutic action both on the blood hypertension and on the symptoms usually accompanying this disease.

Reserpine 3,5,3'-triiodothyroacetate is obtained starting from the fact discovered by Dorfmann et al. (Helvetica Chemica Acta 1954, 37, 59), that weak bases such as reserpine behave like strong bases in an acetic acid medium.

The present invention has therefore also for its object the prepartion of reserpine 3,5,3'-triiodothyroacetate by reacting reserpine with 3,5,3'-triiodothyroacetic acid in an acetic acid medium.

According to an advantageous embodiment of the process according to the present invention, the reaction partners used are present as solutions in acetic acid.

According to another advantageous embodiment of the process according to the present invention, the reaction partners used are present in equimolecular quantities.

According to still another advantageous embodiment of the process according to the present invention, the acetic acid used as a reaction-medium is a concentrated acetic acid, for instance 2 N to 6 N.

The process of preparing reserpine 3,5,3'-triiodothyroacetate according ot the present invention will now be described in a more detailed way in the following example which is only given by way of illustration of the invention, without constituting in any way a limitation to it.

EXAMPLE 20 grams of commercial reserpine are dissolved in 1,200 milliliters of 2 N acetic acid at the temperature of a boiling water bath. The light insoluble residue thus obtained is separated by decantation. The solution is then cooled in an ice bath and then 20 grams of 3,5,3'-triiodothyroacetic acid dissolved in 150 milliliters of acetic acid are added thereto. A light yellow precipitate forms immediately. The reaction mass is allowed to rest during 24 hours and then centrifuged. Said mass is then left during 14 hours in a desiccator under vacuum, over a potash bed. The resulting solid product is redissolved in distilled water until the acetic odour has vanished. Thus, a first fraction of the product (weighing 20 g.) is isolated after drying in atmospheric air. (M.P.=157–162° C.).

The filtrate from the first centrifugation step is concentrated under vacuum at 40° C.; the semi-solid residue is dissolved by using the first washing water. The precipitate is centrifuged and washed as set forth hereinabove, with distilled water. The product is then dried in the atmospheric air and thus 11 g. of reserpine 3,5,3'-triiodothyroacetate (M.P.=164–168° C.) are obtained with a 77% yield. The M.P. is raised to 168–172° C. by recrystallization from aqueous methanol.

*Analysis.*—Calculated for $C_{47}H_{49}O_{13}N_2I_3$: C, 45.6%; H, 3.9%; N, 2.27%. Found: C. 44.55%; H, 4.26%; N, 2.46%. M.W.: 1,230.

The study of the pharmacological and pharmacodynamic properties of reserpine 3,5,3'-triiodothyroacetate has set in sharp relief the low toxicity of the novel medicament according to this invention. Moreover, it has permitted of evidencing the fact that the hypotensive therapeutic activity of reserpine is not impaired by its chemical combination with 3,5,3'-triiodothyroacetic acid, and that the inhibiting activity exerted by 3,5,3'-triiodothyroacetic acid on the respiratory mechanisms of mitochondrias is not reduced by the chemical combination of this compound with reserpine.

(1) Toxicity

The $LD_{50}$ per os in the rat seems to approximate 100 mg. per kg.

The chronic toxicity test carried out during 4 months with one-tenth of the $LD_{50}$, i.e., 10 mg. per kg., did not produce any lesion in the liver, the kidneys, the spleen and the blood. The growth of the animals continued normally, and the animal did not get excited.

(2) Pharmacodynamic study (a) Inherent activity of 3,5,3'-triiodothyroacetic acid.—It has been proved that this compound inhibits the respiration of mitochondria in presence of a phosphate acceptor. In the case of phosphorylation, the respiration is reduced.

The curve showing the variations in the oxygen consumption of a medium is traced automatically by an oxygraph of the vibrating platinum-electrode type. It is observed that the higher the concentration, the greater the inhibiting power of 3,5,3'-triiodothyroacetic acid (which is shown by the slope of this curve).

After having ascertained that reserpine alone, as well as the solvent utilized therewith, modify but only very slightly the oxygen consumption curve, reserpine 3,5,3'-triiodothyroacetate is used at equivalent molecular concentration values. The general trend of the consumption curve can be compared with those obtained with 3,5,3'-triiodothyroacetic acid.

put in a state of provoked hypertension by pinching its carotids, the hypotensive activity of reserpine is preserved integrally in the product of the reaction of reserpine with 3,5,3'-triiodothyroacetic acid.

The same doses have been administered to rats enclosed in "activometric" suspended cages of which all the movements are counted.

Under these conditions the sedative activity of reserpine is also entirely found again in the product of the reaction of reserpine with 3,5,3'-triiodothyroacetic acid.

Clinical experimentation

Clinical experimentation was only rather limited up to now, since it concerned only four patients suffering from arterial hypertension attended by secondary symptoms.

However, this experimentation, in some of its limited character, evidenced an appreciable therapeutic action not only in the field of arterial hypertension but also in connection with the symptoms usually attending this disease, notably hypercholesterolemia and hyperneurotonia.

All of the four patients on which the novel medicament according to this invention was tested under clinical conditions suffered from arterial hypertension (AHT). In two cases this disease was attended by atherosclerosis. In a third case, AHT resulted from menopause and in the last case it was a fundamental AHT as no cause had been found.

All these patients, about 50-year-old, were administered the same therapeutic treatment with the same posology: two tablets, dosed 2 mg. per day of reserpine triiodothyroacetate.

The results of the clinical experimentation with the novel medicament according to this invention are summarized in the following table:

|  | Case 1—51-years-old, man | Case 2—49-years-old, man | Case 3—55-years-old, woman | Case 4—46-years-old, man |
|---|---|---|---|---|
|  | AHT plus atherosclerosis | AHT plus atherosclerosis | AHT plus menopause | AHT "fundamental" |
| Before treatment | 22/10 | 19/9 | 23/12 | 20/12. |
| 15th day of treatment | | 19/9 | 21/11 | 16.5/10. |
| End of treatment (21 days) | 18/9 | 16.5/9 | 21/11 | 16.5/10.5. |
| 1 week after end of treatment | 18/9.5 | 17.5/9.5 | 18/10 | 17/10.5. |
| Associated symptoms | Obesity | Precordialgia (normal ECG), hyperneurotonia, insomnia. | Post-menopausic functional signs, discrete obesity. | Cephalias, vertigo, hyperneurotonia. |
| Laboratory tests | Total cholesterol =3.90 grams; Hyperbetalipoproteinemia; Burstein: 69 Vernes units. | Total chol.=3.50 g.; Burstein:normal; Azotemia: 0.57 g. |  | Azotemia 0.62 g. |
| Associated medicaments | Heat restriction; iodine | Non-barbituric sedative | Oestrogens; Moderate heat restriction. |  |
| Results | Good; An interesting action on biological elements is worth mentioning: Tot. cholest. 3.10 g. Burstein: 51 V.U. | Fairly good; Total cholesterol=3.20 g. | Very good | Good; A very good sedative effect, in the absence of any other treatment is worth mentioning Azotemia: 0.49 g. |

From the foregoing it may be inferred that, in practice, with reserpine 3,5,3'-triiodothyroacetate, the inhibition created by 3,5,3'-triiodothyroacetic acid is found again (plus the moderate inhibition caused by reserpine itself).

As a result of the foregoing, it may be concluded that the activity of 3,5,3'-triiodothyroacetic acid on the more specific mechanisms of the behavior of mitochondria is preserved integrally in the product of the reaction of this acid with reserpine.

(b) Inherent activity of reserpine. — Equimolecular doses of reserpine 3,5,3'-triiodothyroacetate (2 mg./kg./IV) and reserpine (1 mg./kg./IV) have been administered by the venous route to two groups of rats previously rendered hypertensioned by pinching their carotids.

The hypotension curves obtained during the observation (10 hours) are significantly comparable.

From the foregoing it may be inferred that in the animal

The above-disclosed results of the clinical experimentation prove that the novel medicament according to this invention is a substance exerting alone a therapeutic action hitherto exerted by different medicaments of which the action had to be associated to permit of obtaining a therapeutic result of the same order as that obtained with reserpine 3,5,3'-triiodothyroacetate.

Administration forms

Reserpine 3,5,3'-triiodothyroacetate can be administered in various forms and notably in the form of intravenous or intramuscular injections, and also in the form of tablets, sugar-coated pills or boluses, drinkable compositions, suppositories.

A typical example of the form of administration and posology utilized during the clinical experimentation, is 2 to 4 tablets of reserpine triiodothyroacetate per day, each dose to 2 milligrams.

From the foregoing it is obvious to anybody conversant with the art that the novel medicament according to this invention is characterised by many advantageous features over known medicaments aiming at treating diseases of the same type, notably in that it combines into a single medicament a plurality of therapeutic activities, notably a combined hypotensive, antiatheromatous and antisclerous activity as clearly evidenced both by the pharmacodynamic study and by the clinical experimentation to which reference is made hereinabove.

Therefore, the therapeutical field of the novel medicament according to this invention includes the treatment of hypertension of the fifties, atheromia and pre-atheromatous syndromes, as well as the treatment of the secondary effects of hypertension. Having thus disclosed the invention what is claimed is:

1. Reserpine 3,5,3'-triiodothyroacetate having the following formula:

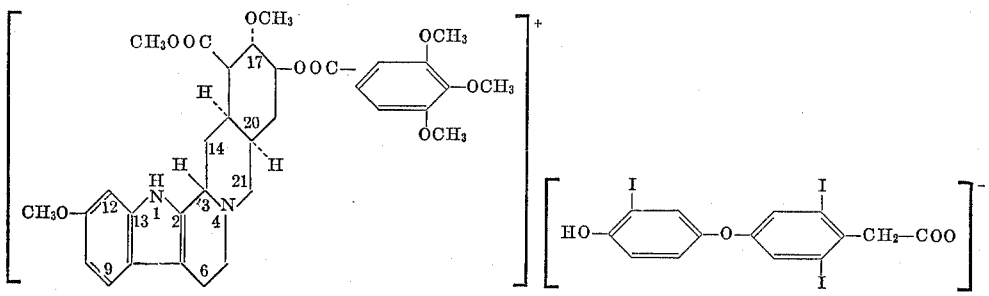

References Cited

UNITED STATES PATENTS 3,331,855   7/1967   Popelak et al. _____ 260—240

OTHER REFERENCES

Dorfmann, et al. Helv. Chim. Acta, vol. 37 (1954), p. 68.

JAMES A. PATTEN, Primary Examiner

U.S. Cl. X.R.

260—236; 424—262